US010296479B1

(12) United States Patent
Baeckler et al.

(10) Patent No.: US 10,296,479 B1
(45) Date of Patent: May 21, 2019

(54) SCALABLE CIRCUITRY AND METHOD FOR CONTROL INSERTION

(71) Applicant: ALTERA CORPORATION, San Jose, CA (US)

(72) Inventors: Gregg William Baeckler, San Jose, CA (US); David W. Mendel, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 657 days.

(21) Appl. No.: 14/975,370

(22) Filed: Dec. 18, 2015

(51) Int. Cl.
*G06F 9/00* (2006.01)
*G06F 13/40* (2006.01)
*G06F 13/38* (2006.01)
*G11C 7/10* (2006.01)
*G11C 19/00* (2006.01)
*G11C 21/00* (2006.01)
*G06F 9/30* (2018.01)

(52) U.S. Cl.
CPC ...... *G06F 13/4022* (2013.01); *G06F 9/30134* (2013.01); *G06F 13/387* (2013.01); *G06F 13/4018* (2013.01); *G11C 7/1012* (2013.01); *G11C 7/1072* (2013.01); *G11C 19/00* (2013.01); *G11C 21/005* (2013.01)

(58) Field of Classification Search
CPC .......................... G06F 9/30134; G11C 19/00
See application file for complete search history.

(56) References Cited

U.S. PATENT DOCUMENTS

| | | | |
|---|---|---|---|
| 8,918,682 B2 | 12/2014 | Baeckler | |
| 2003/0046429 A1* | 3/2003 | Sonksen | G06F 15/17337 709/246 |
| 2016/0050010 A1* | 2/2016 | Buehler | H04B 7/1851 455/73 |

* cited by examiner

*Primary Examiner* — Zachary K Huson
(74) *Attorney, Agent, or Firm* — Compass IP Law PC

(57) ABSTRACT

The present disclosure provides an innovative circuit structure for control insertion into a multiple-word wide data stream. The control-insertion circuit structure is advantageously scalable as the data width increases. An exemplary implementation of the control-insertion circuit structure includes a multiple-layer shifting circuit. The multiple-layer shifting circuit has some similarities with a barrel shifter. However, unlike a barrel shifter, the multiple-layer shifting circuit moves data words in both directions and moves portions of the data to create spaces or holes in the data (rather than moving the entire width as a barrel shifter does). The output of the multiple-layer shifting circuit is a "swiss-cheese-like" structure of data, where the spaces or holes in the data are available for control insertion. Other features, aspects and embodiments are also disclosed.

18 Claims, 9 Drawing Sheets

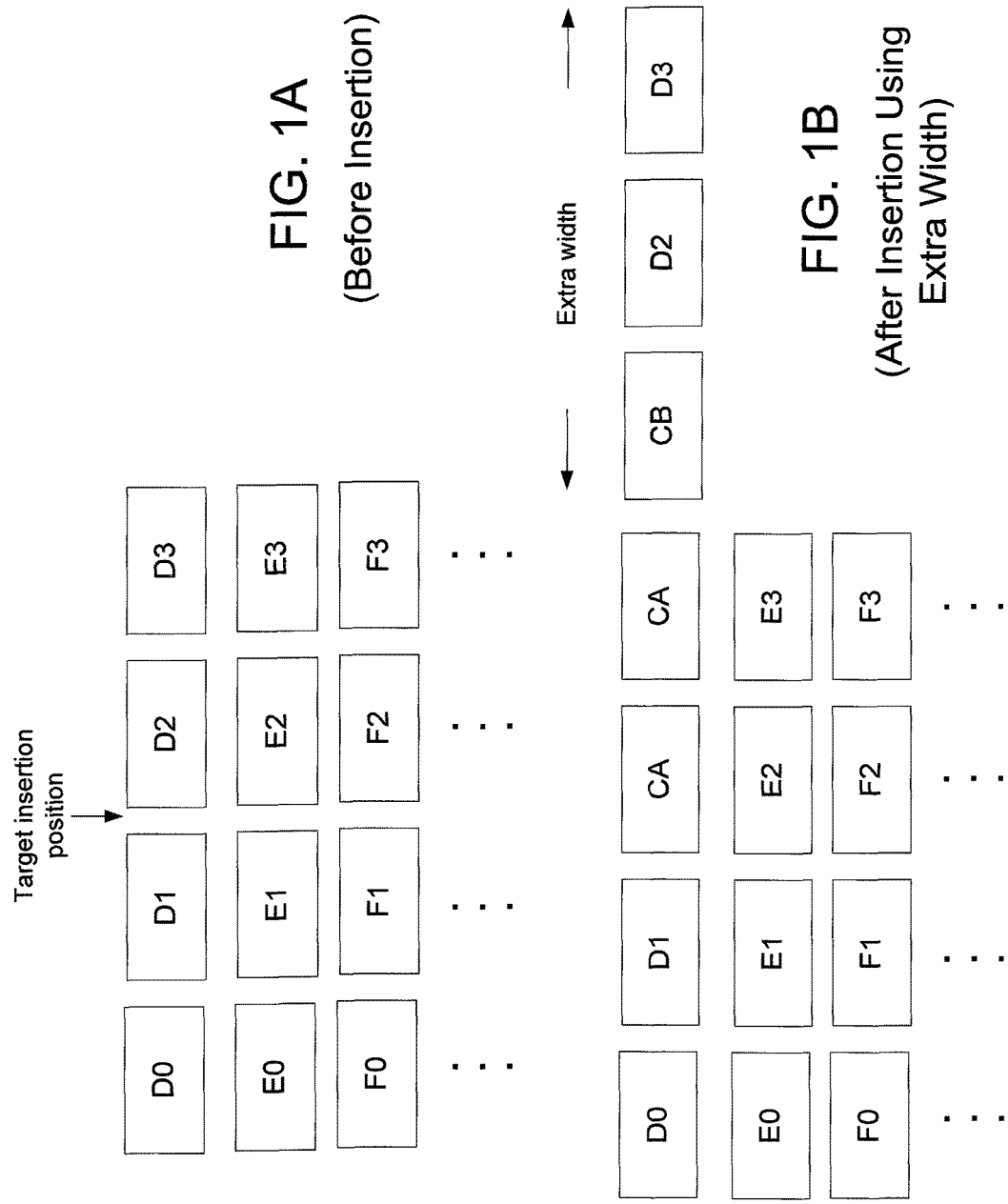

(Reprocessed)

SCALABLE CIRCUITRY AND METHOD FOR CONTROL INSERTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Technical Field

The present disclosure relates generally to electronic interfaces.

Description of the Background Art

Generally, interconnect circuitry on a communication network is built according to a standard networking protocol. The networking protocol may include various protocol layers. The protocol layers may be stacked hierarchically. One of the more common standard networking protocols is based on the Open System Interconnections (OSI) model.

Among the standard networking protocols, there may be protocols to transmit or receive data. Such protocols are usually implemented on an integrated circuit. Typical protocols for transmitting or receiving include, among others, the Interlaken and Ethernet protocols.

SUMMARY

The present disclosure provides an innovative circuit structure for control insertion into a multiple-word wide data stream. The control-insertion circuit structure is advantageously scalable as the data width increases.

An exemplary implementation of the control-insertion circuit structure includes a multiple-layer shifting circuit. The multiple-layer shifting circuit has some similarities with a barrel shifter. However, unlike a barrel shifter, the multiple-layer shifting circuit moves data words in both directions and moves portions of the data to create spaces or holes in the data (rather than moving the entire width as a barrel shifter does). The output of the multiple-layer shifting circuit is a "swiss-cheese-like" structure of data, where the spaces or holes in the data are available for control insertion.

One embodiment relates to a method of providing for insertion of control words into a multiple-word wide stream of data words. A pattern of control flags is received by a pre-processing circuit. The pattern of control flags indicates locations to insert control words into a rack of words of the multiple-word wide data stream. A plurality of signed offsets is generated using the pattern of control flags. One signed offset is generated for each word in the rack of the data words.

Another embodiment relates to a method of making spaces for control words into a multiple-word wide stream of data words. A pre-spacing stream of the data words with no spaces therein may be received by a multiple-layer shifting circuit. The multiple-layer shifting circuit applies a binary progression of right shifts and a binary progression of left shifts and outputs a post-spacing stream of the data words with the spaces provided therein for subsequent injection of control words. The data words and control words may be represented by receipts.

Another embodiment relates to an apparatus for control insertion into a multiple-word wide data bus. A pre-processing circuit receives a plurality of control flags and generates a plurality of signed offsets. A multiple-layer shifting circuit receives a pre-spacing multiple-word wide data stream and generates a post-spacing multiple-word wide data stream. The multiple-layer shifting circuit is controlled by the plurality of signed offsets.

Other features, aspects and embodiments are also disclosed.

BRIEF DESCRIPTION OF THE DRAWINGS

FIG. 1A illustrates a multiple-word wide data stream into which control words are to be inserted.

FIG. 1B illustrates an executed control insertion where the data width is expanded to accommodate the insertion.

FIG. 7 shows sample program output that validates the operation of the circuitry in an exemplary implementation of an embodiment of the invention.

DETAILED DESCRIPTION

Figure 1C:
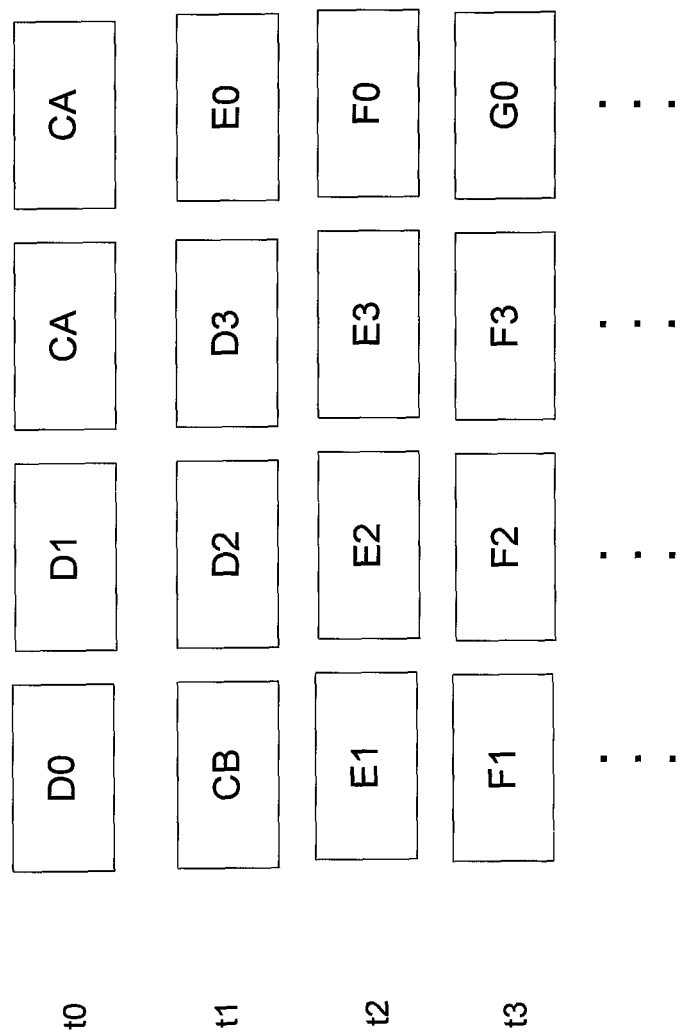
FIG. 1C illustrates the data stream after reprocessing to restore the data width to match the data bus width.

Data word streams may be transmitted across data networks using media access control (MAC) layer networking protocols, such as Interlaken or Ethernet, for example. The MAC layer protocols generally require control words to be inserted into the data word stream. The control words indicate information about the stream, such as, for example, the gap between data packets being transmitted. The MAC layer protocols also generally have rules that affect the locations at which the control words may be inserted. These rules are protocol specific.

For low bandwidth (i.e. low data rate) data networking, the data word stream may be simply halted and the desired control words transmitted during the halt. However, at high bandwidths (i.e. at high data rates), the problem increases exponentially in complexity.

At high bandwidths, multiple data words are generally transmitted at same time across a wide data bus. For example, the data bus may be 256-bits wide (each word being 64 bits). In this case, the data bus is a 4-words wide so that 4 words are transmitted in parallel. As another example, the data bus may be 512-bits wide. In this case, the data bus transmits 8-words wide so that 8 words are transmitted in parallel. As another example, the data bus may be 1024-bits wide. In this case, the data bus transmits 16-words wide so that 16 words are transmitted in parallel.

Determining at which locations within the multiple-word wide bus to insert the control words becomes a problem. The problem becomes exponentially more complex as the bus becomes wider. This is because the data stream needs to be "swiss cheesed" by control words that are injected at multiple points within the stream.

The present disclosure provides an innovative circuit structure for control insertion into a multiple-word wide data stream. The control-insertion circuit structure is advantageously scalable as the data width increases.

The control-insertion circuit structure includes a multiple-layer shifting circuit. The multiple-layer shifting circuit has some similarities with a barrel shifter. However, unlike a barrel shifter, the multiple-layer shifting circuit moves data words in both directions and moves portions of the data to create spaces or holes in the data (rather than moving the entire width as a barrel shifter does). The output of the multiple-layer shifting circuit is a "swiss-cheese-like" structure of data, where the spaces or holes in the data are available for control insertion.

FIG. 1A illustrates a multiple-word wide data stream into which control words are to be inserted. For ease of illustration, the data stream is four words wide. Of course, other widths, particularly wider ones, may be used.

As depicted, a first row of words in the data stream includes words D0, D1, D2 and D3. A second row of words in the data stream includes words E0, E1, E2 and E3. A third row of words in the data stream includes words F0, F1, F2 and F3. And so on. The first row is to be transmitted first, then the second row, then the third row, and so on.

Indicated in FIG. 1A is a position at which control words are to be inserted. In this illustrative example, the position for control word insertion is between D1 and D2.

A common conventional method of inserting control words into such a multiple-word wide data stream is to make the data wider to accommodate the insertion. Subsequently, the data words are reprocessed to manipulate the width back down to the bus width.

FIG. 1B illustrates an executed control insertion where the width of the current "rack" of words is expanded to accommodate the insertion. Here, the term "rack" of words means an array of words of the system native bus width. In this illustrative example, three control words (CA, CA, and CB) are inserted between D1 and D2. In order to accommodate this insertion, the width of the current "rack" of words is shown to be increased from four words to seven words.

FIG. 1C illustrates the data stream after reprocessing to restore the data width to match the bus width. In this case, the first row is reduced from seven words back to four words (D0, D1, CA and CA), and another row is created with four words (CB, D2, D3 and E0), followed by a third row of four words (E1, E2, E3 and F0), then a fourth row of four words (F1, F2, F3 and G0), and so on. As indicated in the figure, the first row may be transmitted at time t0, the second row at time t1 (one unit time after t0), the third row at time t2 (one unit time after t1), the fourth row at time t3 (one unit time after t2), and so on.

Unfortunately, implementing circuitry to accomplish the technique illustrated by FIGS. 1B and 1C is problematic. This is because the data width may need to get much wider in certain circumstances and also because substantial circuitry may be needed for reprocessing to restore the bus width.

Figure 2A:
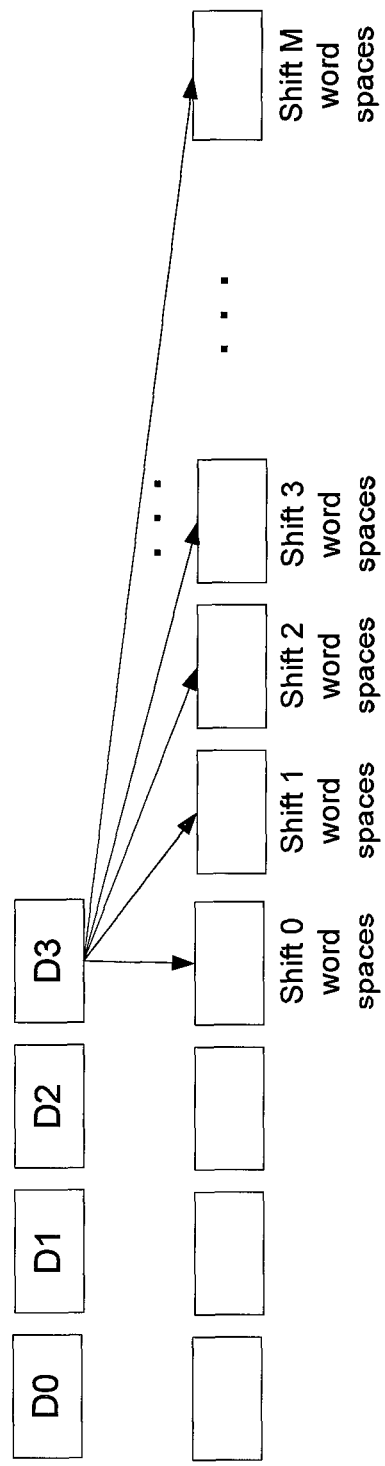
FIG. 2A illustrates the exponentially growing complexity issue with expanding the data width.

FIG. 2A illustrates the exponentially growing complexity issue with expanding the data width. The top row shows the data width prior to expansion.

However, any number of possible control word insertions (from zero up to a maximum number of words, which may be quite large), must be accommodated by the circuitry. For example, as shown with the arrows, the possible expansion may cause the rightmost data word D3 in the present "rack" of words to be shifted zero word spaces, one word space, two word spaces, three word spaces, and so on, up to a maximum M number of word spaces, where M depends on the rules of the specific protocol.

Figure 2B:
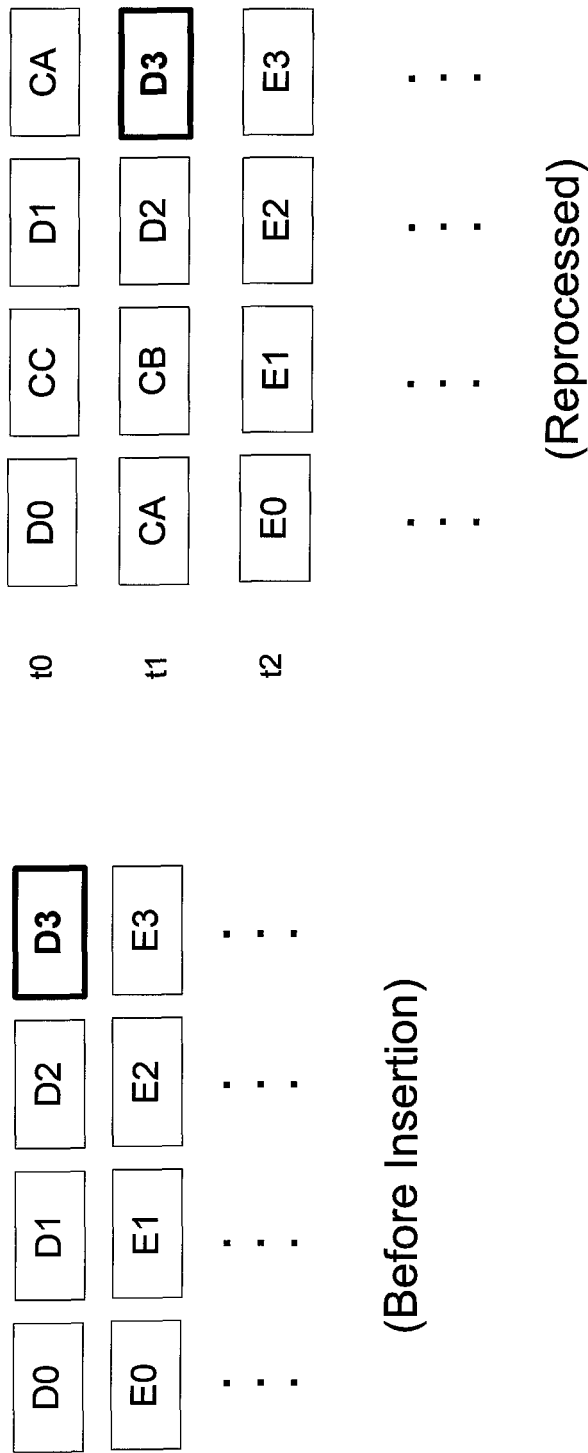
FIG. 2B illustrates a key observation driving the efficiency of the present invention.

FIG. 2B illustrates a key observation driving the efficiency of the present invention. In the depicted example, four control words (CC, CA, CA and CB) are inserted such that, after reprocessing, the data word D3 is in the second row to be transmitted at time t1. However, it is observed that, while D3 will be transmitted at a later time (in particular, the next cycle), it is at the same position within the data bus as before insertion.

Hence, expanding the width in order to accommodate the control insertion may not be necessary. Instead, it may be more efficient to determine the position (within the bus width) and cycle (row) to which each word needs to be moved in order to accommodate the control insertion.

Figure 3:
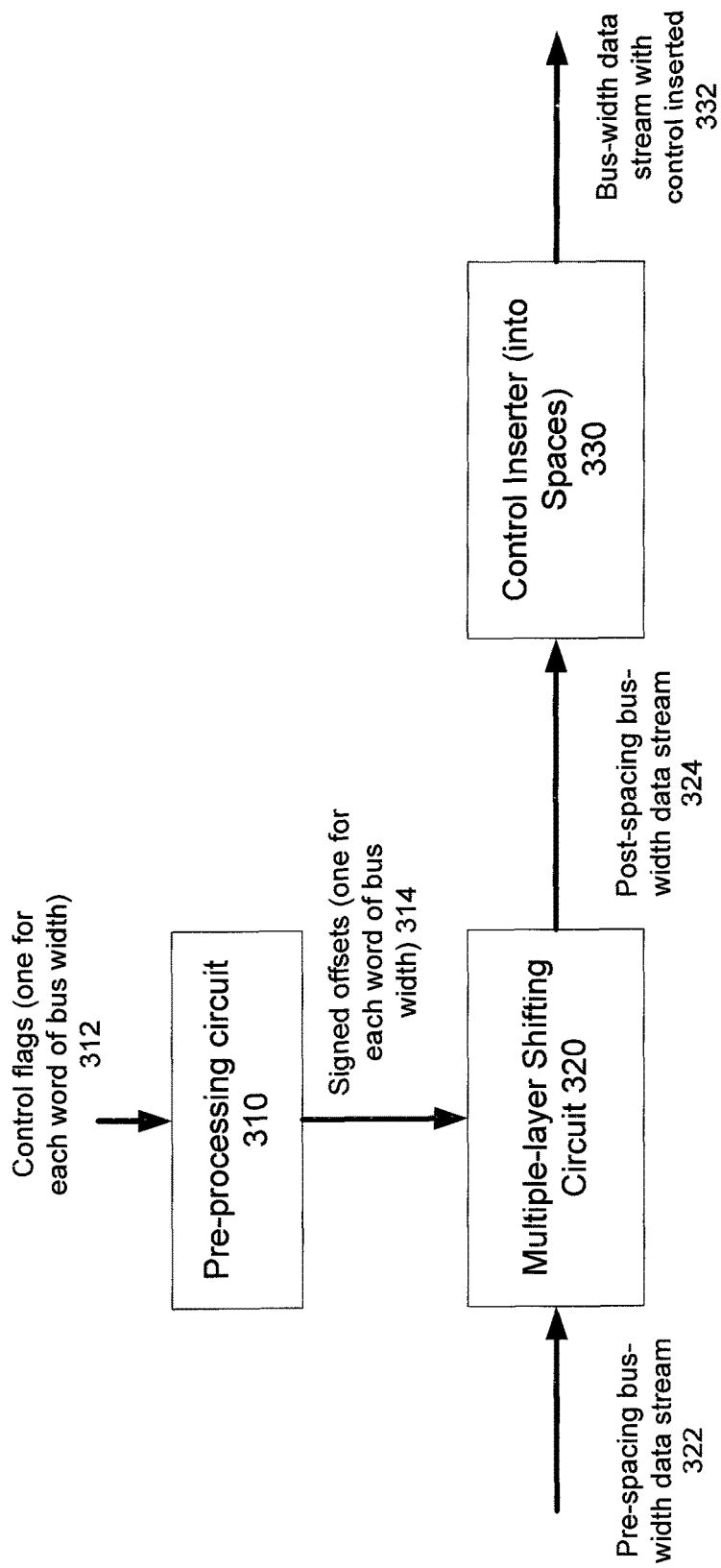
FIG. 3 depicts a control-insertion circuit structure in accordance with an embodiment of the invention.

FIG. 3 depicts a control-insertion circuit structure 300 in accordance with an embodiment of the invention. As depicted, the control-insertion circuit structure 300 may include a pre-processing circuit 310 and a multiple-layer shifting network 320.

Control flags 312 may be input into the pre-processing circuit 310. Each control flag may indicate insertion (or not) of a specific control word at a particular word position in the bus width. There may be multiple control flags for each word position in the bus width, each control flag being for a different control word.

The pre-processing circuit 310 may use the control flags 312 to generate signed offsets 314 for the corresponding words. Each signed offset may indicate a shift in position of a corresponding word (as needed to accommodate the insertion of control words indicated by the control flags). The signed offsets 314 generated by the pre-processing circuit 310 are input as controls to the multiple-layer shifting network 320.

The multiple-layer shifting network 320 receives as input the pre-spacing stream of data words (pre-spacing data stream) 322. The width of the pre-spacing data stream is the width of the data bus. The pre-spacing data stream 322 is the data stream prior to insertion of spaces (or "holes").

The multiple-layer shifting network 320 generates a post-spacing stream of data words (post-spacing data stream) 324. The width of the post-spacing data stream is also the width of the data bus (i.e. is the same width as the pre-spacing data stream). However, the post-spacing data stream has spaces (or "holes") for control words to be inserted therein. These spaces may be indicated, for example, by space (or "hole") flags associated with corresponding positions in the post-spacing stream.

The control inserter 330 receives the post-spacing data stream 324 and inserts control words into the spaces therein. The result is a post-insertion data stream 332. The width of the post-insertion data stream is also the width of the data bus (i.e. is the same width as the pre-spacing and post-spacing data streams). However, the post-insertion data stream has control words inserted into the spaces (or "holes") of the post-spacing stream.

Note that the pre-spacing and post-spacing data streams (322 and 324) may include either the actual data words (64 bits), or receipts for the data words (for example, 4-6 bits). The receipts would indicate which FIFO in an array of FIFOs holds the actual data word that corresponds to the receipt. If the bus width is 16 words, then 16 FIFOs would be used. In that case, 4 bits of the receipt are needed to indicate from which FIFO to obtain the data word. An additional bit (or more) may be utilized so that the same receipt may also indicate specific control words to be inserted into the stream.

Figure 4:
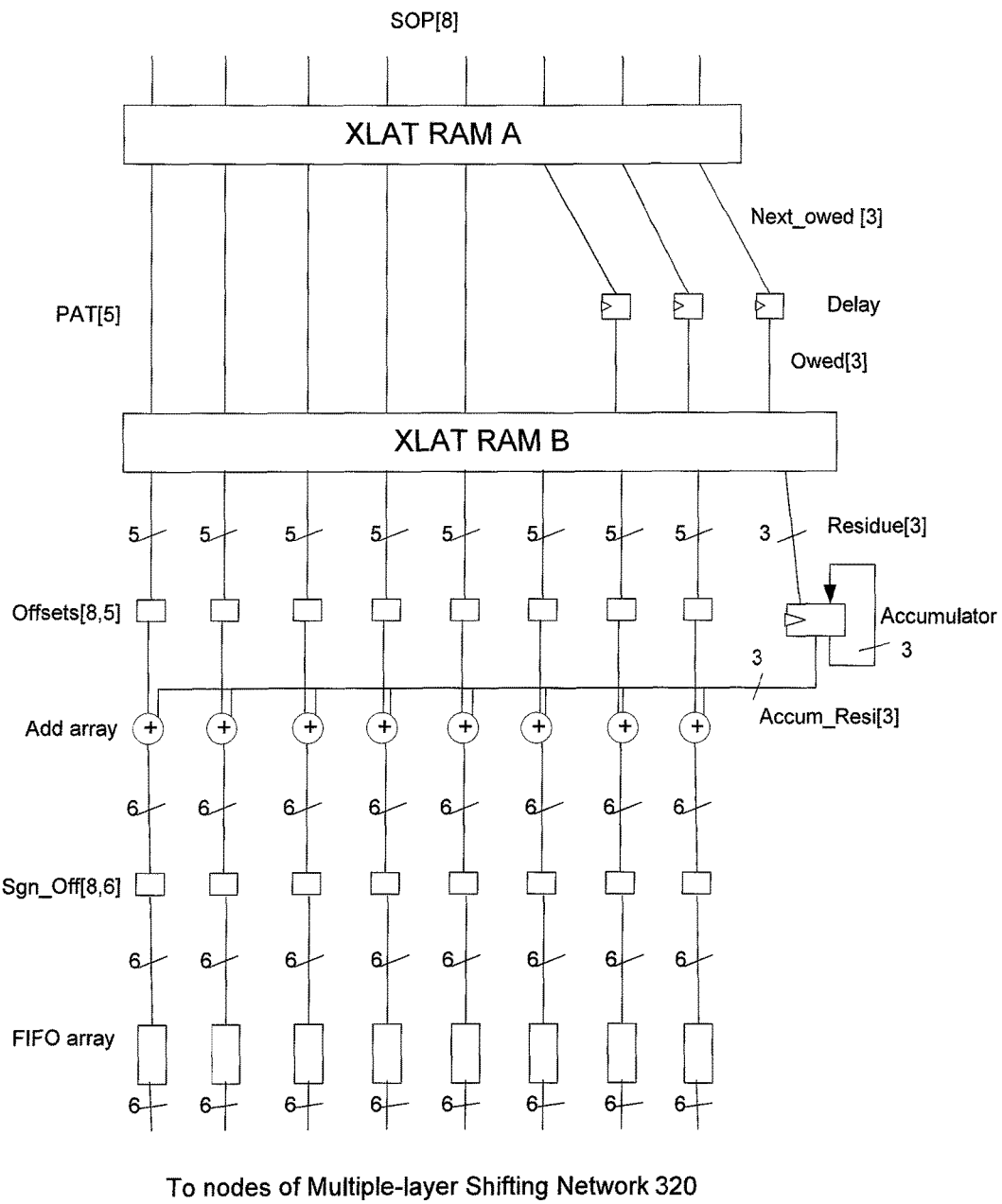
FIG. 4 depicts an exemplary implementation of a pre-processing circuit that generates control inputs in accordance with an embodiment of the invention.

FIG. 4 depicts an exemplary implementation of a pre-processing circuit 310 that generates control inputs in accordance with an embodiment of the invention. In this case, the pre-processing circuit 310 is designed to implement certain rules from the Ethernet protocol. These rules include a two-word interpacket gap and an 8-word minimum packet size (which may be fulfilled by padding).

In the exemplary implementation depicted in FIG. 4, the pre-processing circuit 310 processes, in each cycle, eight start-of-packet (SOP) flags for an 8-word wide data bus. The size of the data bus is limited to eight words for demonstration purposes, but the pre-processing circuit 310 advantageously scales in a straight forward manner to higher widths. As depicted, the pre-processing circuit 310 may include first and second translation random access memory circuits (XLAT RAM A and XLAT RAM B).

XLAT RAM A receives, in each cycle, the 8-bit SOP pattern (for a current "rack" of 8 data words) and compresses the 8-bit SOP pattern to a 5-bit compressed SOP pattern, PAT[5]. The 8-bit SOP pattern is compressible because many of the 8-bit SOP patterns are illegal (according to the applicable Ethernet protocol rules) and so cannot occur. Consider a system having a minimum required data length for injection, such as a minimum of 2 words long, for example. For such a system, an illegal SOP sequence would be one with consecutive SOPs (e.g., SOP SOP SOP). To be legal, the SOP sequence would need to be spaced, i.e. SOP, (wait), SOP, etc.

In addition, XLAT RAM A generates a 3-bit Next_owed signal that indicates the number of words (0 to 7) that are owed to a current packet (for a packet started in this rack) in order to make its packet length meet the minimum of 8 words, as per the Ethernet rules. For example, if the SOP flag of the last word position (position 7 in the position range of 0 to 7) in this rack indicates a start of packet, then the Next_owed signal may be 7 to indicate that 7 words are "owed" by the next rack in order to fulfill the 8-word minimum. (If needed, these owed words may be fulfilled by inserting padding in the next rack.) The Next_owed signal is delayed by one cycle to become a 3-bit Owed signal that is input into XLAT RAM B.

XLAT RAM B 5-bit compressed SOP pattern and the 3-bit Owed signal and generates eight Offsets for the eight words. In this case, under the Ethernet rules being applied (including the two word gap before start of packets and the 8-word minimum packet size), the Offsets will each be within the range from 0 to +29. Hence, in the worst case, the rightmost data word will be shifted right 29 word places by a greatly expanding number of words on the left of it. In other words, M=29 in the above description of FIG. 2A. To represent this range of shifts, each of the 8 Offsets must be 5 bits, so that the output of XLAT RAM B may be represented by Offsets[8,5].

In addition, XLAT RAM B outputs a 3-bit Residue signal that may vary from 0 to 7. The Residue may be computed as 8 minus the Offset modulo 8 for the last (i.e. the rightmost) word in the current rack. For example, if the Offset for the last word in the current rack is +29, then the Residue=8−(29 modulo 8)=8−5=3.

The Residues are accumulated by the Accumulator, which outputs the accumulated residue modulo 8 (Accum_Resi). The Accum_Resi indicates the number of word positions (0 to 7) that the current rack will have to be shifted to the left in order to fill empty spaces in the previous rack. For example, if the Accum_Resi is 4, then the current rack needs to be shifted 4 word positions to the left (i.e. −4 word positions to the right) to fill empty spaces in the previous rack.

The Add array subtracts the Accum_Resi from the eight Offsets to obtained eight Signed Offsets (Sgn_Off). In this particular example, each Sgn_Off signal may range from −7 to +29 and so is represented by a 6-bit signal.

Note that shifting to the right by 8 positions is equivalent to being delayed by one cycle. Hence, only delays, and not actual shifts, are needed when the Sgn_Off modulo 8 is 0. This feature advantageously takes advantage of the observation described above in relation to FIG. 2B.

The Signed Offsets are input to a FIFO array. The FIFO array is used to regulate the injection rate of the Signed Offsets into the multiple-layer shifting network 320.

Figure 5:
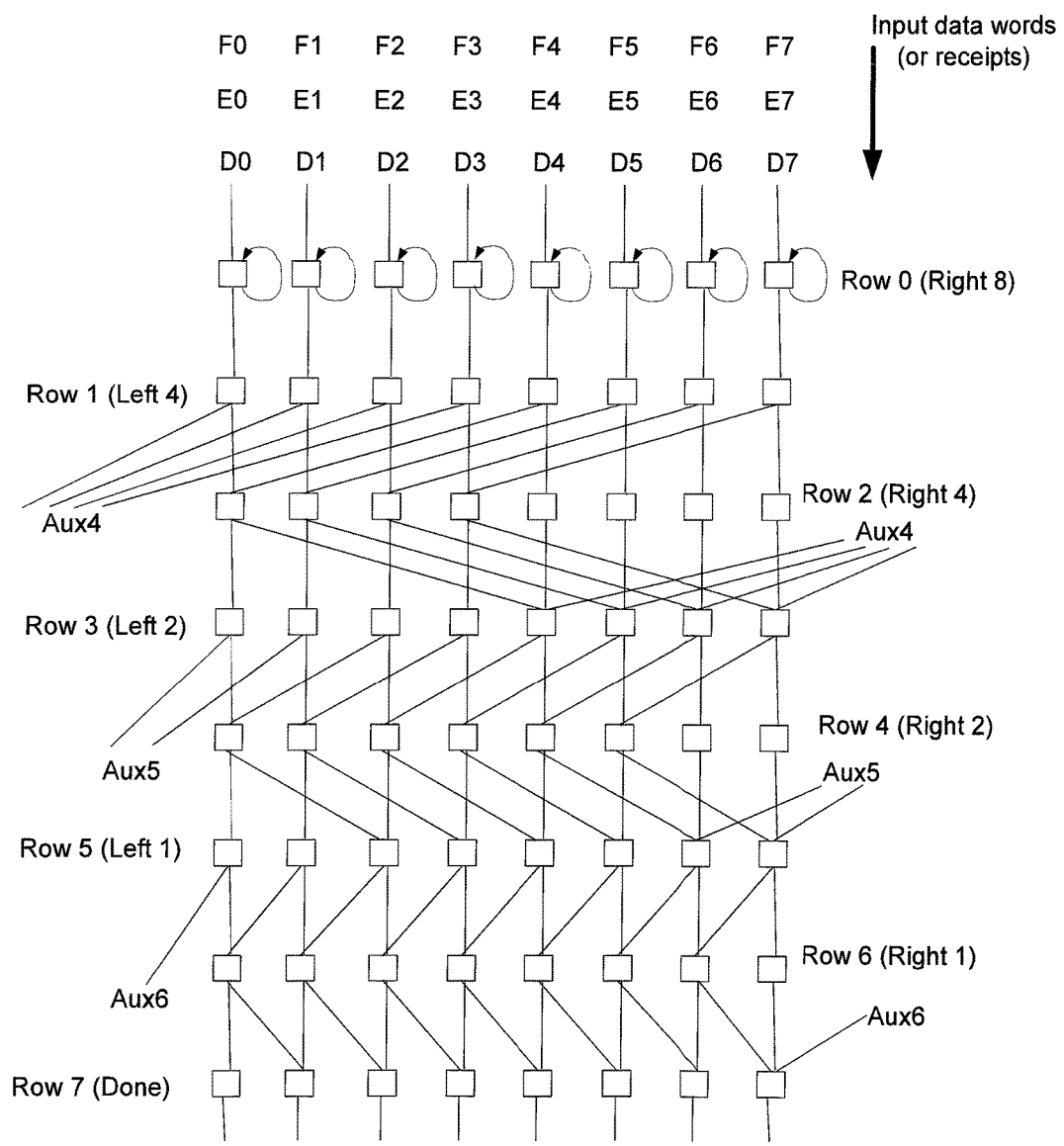
FIG. 5 depicts an exemplary implementation of a multiple-layer shifting circuit that generates a bus-wide stream of data words with spaces (holes) for control insertion in accordance with an embodiment of the invention.

FIG. 5 depicts an exemplary implementation of a multiple-layer shifting circuit 500 that generates a bus-wide stream of data words with spaces (holes) for control insertion in accordance with an embodiment of the invention. In the depicted embodiment, the multiple-layer shifting circuit 500 is designed so that no node has more control inputs than may be implemented in a 6-input look-up table (6 LUT). The LUT differs at each node and may decrease in size for nodes in deeper layers of the multiple-layer shifting circuit 500.

Each layer (row) in the multiple-layer shifting circuit 500 has a number of nodes equal to the width of the data bus in words. For the depicted example, the data bus is 8 words wide, so that each layer has 8 nodes. (In another example, if the data bus was 16 words wide, then each layer would have 16 nodes.)

Data words are input into the first row of nodes (Row 0). As depicted: a first rack (horizontal row) of input data words is denoted D0, D1, D2, . . . , D6 and D7; a second rack (horizontal row) of input data words is denoted E0, E1, E2, . . . , E6 and E7; a third rack (horizontal row) of input data words is denoted F0, F1, F2, . . . , F6 and F7; and so on.

Note that the following discussion of FIG. 5 describes data words (and associated Signed Offsets) as being input and shifted. However, an exemplary implementation may actually input and shift receipts for data words, where a receipt indicates the FIFO (in an array of FIFOs) from which to obtain the data word.

Note also that the Signed Offset (after decrementing or incrementing is applied, if any) stays with the associated data word as the data word passes through the layers of the multiple-layer shifting circuit 320. Note also that if no data word is held by a node in the multiple-layer shifting circuit 320, then a space (hole) flag may be set to logical one (or a data flag may be reset to logical zero) to indicate that this space has been made available for insertion of a control word.

One aspect of the multiple-layer shifting circuit 500 is that the data shifts are implemented in a binary progression of decreasing shift size. In the depicted example, right shifts of eight word positions are performed, then right shifts of four word positions are performed, then right shifts of two word positions, then right shifts of one word position. Similarly, left shifts of four word positions are performed, then left shifts of two word positions, then left shifts of one word position. The left shifts are interleaved between the right shifts in the depicted example. The binary progression of decreasing shift size advantageously scales logarithmically (slowly) with increasing maximum shift size needed.

Each node in Row 0 (i.e. in the top layer) may receive an input data word and the corresponding 6-bit Signed Offset from the pre-processing circuit 310. The Signed Offset is provided to a 6 LUT at the node to look up whether the node is to perform a "Right 8" shift (i.e. a one cycle delay) of the data word.

If the Signed Offset is in the range of −7 to 0, then no Right 8 shift is performed. This is because a negative value for the Signed Offset indicates a left shift, not a right shift. In this case, the data word moves to the node in the same column in Row 1 for processing during the next cycle.

If the Signed Offset is in the range of 1 to 7, then zero or one Right 8 shift may be performed, depending on the destination of the data word. For example, if the node is in column 3 (which receives D3, E3, F3, . . . ) and the Signed Offset is 2, then the no Right 8 shift would be performed because the destination of the data word is column 5 in the current cycle. In this case, the data word moves to the node in the same column in Row 1 for processing during the next cycle. On the other hand, if the node is in column 2 (which receives D2, E2, F2, . . . ) and the Signed Offset is 7, then the one Right 8 shift would be performed because the destination of the data word is column 1 in the next cycle. If a Right 8 shift is performed, then the Signed Offset is decremented by 8, and the data word stays at its current node in Row 0 for processing during the next cycle.

If the Signed Offset is in the range of 8 to 29, then the destination of the data word is not within the current rack (no matter its position within the current rack). Hence, a Right 8 shift is performed by decrementing the Signed Offset by 8 and keeping the data word at its current node in Row 0 for processing during the next cycle.

Each node in Row 1 (i.e. in the second layer from the top) may receive a data word (and an associated Signed Offset), if any, from the previous row (Row 0). The Signed Offset is provided to the LUT at the node to look up whether the node is to perform a "Left 4" shift on the data word (i.e. move the data word four positions to the left). If no Left 4 shift is performed, then the data word moves to the node in the same column in the next row (Row 2) for processing during the next cycle. On the other hand, if a Left 4 shift is performed, then the Signed Offset may be incremented by 4, and the data word is shifted four columns to the left in the next row (Row 2) for processing during the next cycle.

Note that, when shifted left by 4 positions, data words (and their associated Signed Offsets) at nodes 0 to 3 in Row 1 are provided to nodes 4 to 7, respectively, in Row 3 for processing during the next cycle. In other words, these data words (and their associated Signed Offsets) are accelerated one cycle to a previous rack. This acceleration is designated by the four lines to and from Aux4 in FIG. 5.

Each node in Row 2 (i.e. in the third layer from the top) may receive a data word (and an associated Signed Offset), if any, from the previous row (Row 1). The Signed Offset is provided to the LUT at the node to look up whether the node is to perform a "Right 4" shift on the data word (i.e. move the data word four positions to the right). If no Right 4 shift is performed, then the data word moves to the node in the same column in the next Row (Row 3) for processing during the next cycle. On the other hand, if a Right 4 shift is performed, then the Signed Offset may be decremented by 4, and the data word is shifted four columns to the right in the next row (Row 3) for processing during the next cycle.

Each node in Row 3 (i.e. in the fourth layer from the top) may receive a data word (and an associated Signed Offset), if any, from the previous row (Row 2). The Signed Offset is provided to the LUT at the node to look up whether the node is to perform a "Left 2" shift on the data word (i.e. move the data word two positions to the left). If no Left 2 shift is performed, then the data word moves to the node in the same column in the next row (Row 4) for processing during the next cycle. On the other hand, if a Left 2 shift is performed, then the Signed Offset may be incremented by 2, and the data word is shifted two columns to the left in the next row (Row 4) for processing during the next cycle.

Note that, when shifted left by 2 positions, data words (and their associated Signed Offsets) at nodes 0 and 1 in Row 3 are provided to nodes 6 and 7, respectively, in Row 5 for processing during the next cycle. In other words, these data words (and their associated Signed Offsets) are accelerated one cycle to a previous rack. This acceleration is designated by the two lines to and from Aux5 in FIG. 5.

Each node in Row 4 (i.e. in the fifth layer from the top) may receive a data word (and an associated Signed Offset), if any, from the previous row (Row 3). The Signed Offset is provided to the LUT at the node to look up whether the node is to perform a "Right 2" shift on the data word (i.e. move the data word two positions to the right). If no Right 2 shift is performed, then the data word moves to the node in the same column in the next row (Row 5) for processing during the next cycle. On the other hand, if a Right 2 shift is performed, then the Signed Offset may be decremented by 2, and the data word is shifted two columns to the right in the next row (Row 5) for processing during the next cycle.

Each node in Row 5 (i.e. in the sixth layer from the top) may receive a data word (and an associated Signed Offset), if any, from the previous row (Row 4). The Signed Offset is provided to the LUT at the node to look up whether the node is to perform a "Left 1" shift on the data word (i.e. move the data word one position to the left). If no Left 1 shift is performed, then the data word moves to the node in the same column in the next row (Row 6) for processing during the next cycle. On the other hand, if a Left 1 shift is performed, then the Signed Offset may be incremented by 1, and the data word is shifted one column to the left in the next row (Row 6) for processing during the next cycle.

Note that, when shifted left by 1 positions, data words (and their associated Signed Offsets) at node 0 in Row 5 is provided to node 7 in Row 7 for processing during the next cycle. In other words, this data word (and its associated Signed Offset) is accelerated one cycle to a previous rack. This acceleration is designated by the line to and from Aux6 in FIG. 5.

Each node in Row 6 (i.e. in the seventh layer from the top) may receive a data word (and an associated Signed Offset), if any, from the previous row (Row 5). The Signed Offset is provided to the LUT at the node to look up whether the node is to perform a "Right 1" shift on the data word (i.e. move the data word one position to the right). If no Right 1 shift is performed, then the data word moves to the node in the same column in the next row (Row 7). On the other hand, if a Right 1 shift is performed, then the Signed Offset may be decremented by 1, and the data word is shifted one column to the right in the next row (Row 7).

The nodes in Row 7 receive and output the resultant post-spacing bus-width of data words after the multiple-layer shifting is applied. Each node in Row 7 may either hold a data word (or receipt for the data word) or hold a space (hole) for insertion of a control word. (If no data word is held by a node in Row 7, then a space (hole) flag may be set to logical one (or a data flag may be reset to logical zero) to indicate that this space has been made available for insertion of a control word.)

Figure 6:
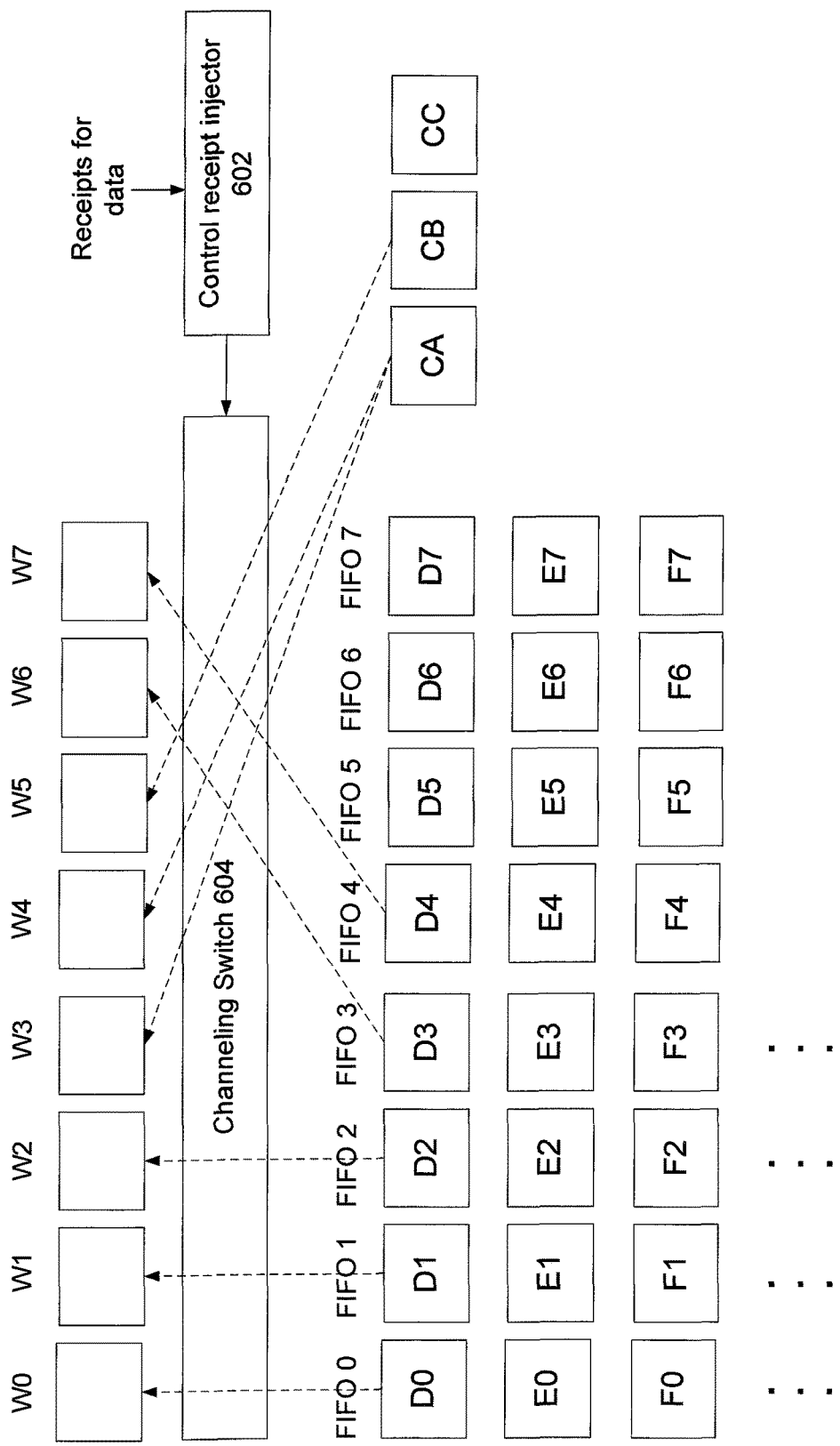
FIG. 6 depicts an exemplary implementation of a control inserter that may be implemented when the multiple-layer shifting circuit operates on receipts, rather than data words themselves, in accordance with an embodiment of the invention.

FIG. 6 depicts an exemplary implementation of a control inserter 330 when the multiple-layer shifting circuit 320 operates on receipts, rather than data words themselves, in accordance with an embodiment of the invention. As depicted, the control inserter 330 may include a control receipt injector 602 and a channeling switch 604. The channeling switch 604 may be implemented, for example, using a cross-bar switch or other circuitry that can perform the necessary switching.

The control receipt injector 602 obtains the receipts for the data words and/or available spaces for the eight word positions from the output of the multiple-layer shifting circuit 320. The control receipt injector 602 may inject receipts for control words into the available spaces, if any.

As depicted, eight FIFOs (FIFO 0, FIFO 1, FIFO 2, . . . , FIFO 6 and FIFO 7) provide the actual data words to be switched to the proper word position in the eight-word wide output bus. The word positions in the output bus being denoted W0, W1, W2, . . . , W6 and W7.

The sources of the control words may be fixed control words. In addition, some control words may be provided by sources that dynamically assemble the control words. For example, flow control information in the Interlaken protocol may be provided by dynamically-assembled control words. As another example, a cyclic redundancy check (CRC) code or other validation code may be computed in parallel by other logic and inserted as part of a control word. For purposes of illustration, the control words are designated CA, CB, CC, and so on. These control words may be, for example, a start-of-packet (SOP) indicator, zero padding, and other control words that depend on the MAC protocol.

The insertion controller 602 sends the rack of receipts (including control receipts injected into the data receipts) to the channeling switch 604 to perform the switching so that the desired data and control words are switched from their sources to their positions for transmission on the data bus.

Based on each receipt that represents a data word, the channeling switch 604 switches which one of the eight FIFOs (0 to 7) is to be the source of the data word for that position. Based on each receipt that represents a control word, the channeling switch 604 switches one of the fixed control words to be the source of the control word for that position.

In the example cycle shown: D0 is switched to W0; D1 to W1; D2 to W2; CA to both W3 and W4; CB to W5; D3 to W6; and D4 to W7. The next cycle would provide data starting at D5 from FIFO 5.

Figure 7:
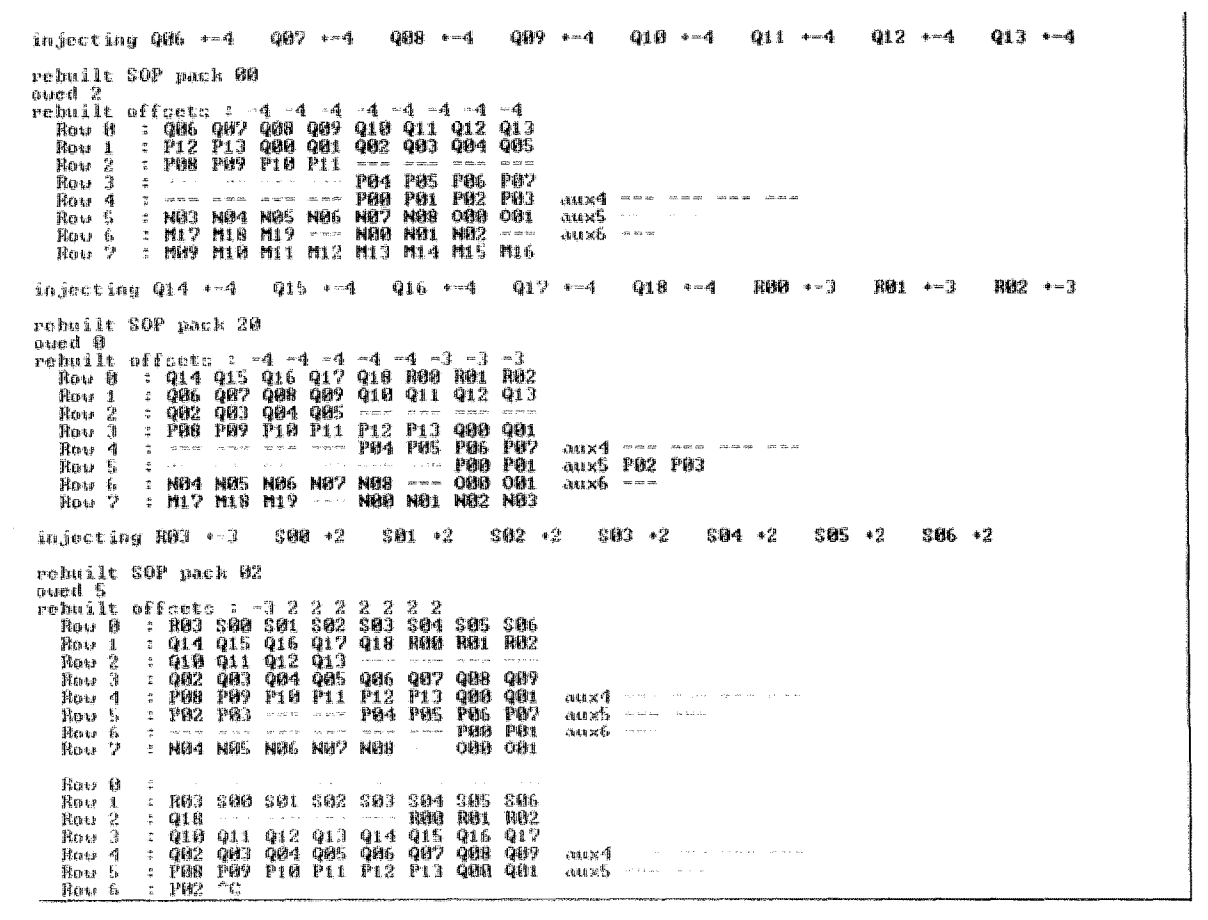

FIG. 7 shows sample program output that validates the operation of the circuitry in an exemplary implementation of an embodiment of the invention. The sample program output was generated using instruction code that 1) builds the lookup RAM contents and 2) simulates the multiple-layer shifting circuit through thousands of random packets to check correctness.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of providing for insertion of control words into a multiple-word wide stream of data words, the method comprising:
   receiving a pattern of control flags by a pre-processing circuit, the pattern of control flags indicating locations to insert control words into a rack of words of the multiple-word wide data stream; and
   generating a plurality of signed offsets using the pattern of control flags, one signed offset for each word in the rack of the data words.

2. The method of claim 1, wherein the pattern of control flags comprises a pattern of start-of-packet flags.

3. The method of claim 2, further comprising:
   compressing the pattern of start-of-packet flags using a first translation random access memory.

4. The method of claim 3, further comprising:
   using the first translation random access memory to generate a next owed signal that indicates a number of words owed to make a current packet meet a minimum size.

5. The method of claim 4, further comprising:
   using the pattern of start-of-packet flags and the next owed signal after delay of one cycle by a second translation random access memory to generate a plurality of offsets and a residue.

6. The method of claim 5, wherein generating the plurality of signed offsets comprises:
   accumulating the residue to generate an accumulated residue; and
   subtracting the accumulated residue from each of the plurality of offsets to obtain the plurality of signed offsets.

7. The method of claim 1, further comprising:
   receiving the multiple-word wide stream of the data words; and
   generating a post-spacing multiple-word wide stream of the data words by a multiple-layer shifting circuit that is controlled by the plurality of signed offsets, wherein the post-spacing multiple-word wide stream of data words includes spaces for insertion of control words.

8. The method of claim 7, wherein the data words are represented by receipts, further comprising:
   injecting receipts for the control words into available spaces within a stream of the receipts for the data words.

9. The method of claim 8, further comprising:
   switching the data words from FIFO buffers based on the receipts for the data words; and
   switching the control words from fixed control word sources based on the receipts for the control words.

10. A method of making spaces for control words into a multiple-word wide stream of data words, the method comprising:
    receiving a pre-spacing stream of the data words with no spaces therein by a multiple-layer shifting circuit, wherein the data words are represented by receipts;

applying a binary progression of right shifts by the multiple-layer shifting circuit;

applying a binary progression of left shifts by the multiple-layer shifting circuit; and outputting a post-spacing stream of the data words with spaces therein.

11. The method of claim 10, wherein the right shifts and the left shifts are interleaved within the multiple-layer shifting circuit.

12. The method of claim 11, wherein the binary progression of right shifts comprises:

selectively performing a first right shift by a first row of nodes in the multiple-layer shifting circuit, wherein the first right shift is equivalent to a delay of one cycle; and selectively performing a first left shift by a second row of nodes in the multiple-layer shifting circuit, wherein the first left shift is half a number of positions and in an opposite direction as the first right shift.

13. The method of claim 12, wherein the binary progressions of right shifts further comprises:

selectively performing a second right shift by a third row of nodes in the multiple-layer shifting circuit, wherein the second right shift is half a number of positions as the first right shift;

selectively performing a third right shift by a fifth row of nodes in the multiple-layer shifting circuit, wherein the third right shift is half a number of positions as the second right shift; and selectively performing a second left shift by a fourth row of nodes in the multiple-layer shifting circuit, wherein the third right shift is half a number of positions as the second right shift.

14. An apparatus for control insertion into a multiple-word wide data bus, the apparatus comprising:

a pre-processing circuit that receives a pattern of start-of-packet flags that indicate locations to insert start-of-packet control words into a rack of data words of the multiple-word wide data stream, and generates a plurality of signed offsets using the pattern of start-of-packet flags, one signed offset for each data word in the rack; and a multiple-layer shifting circuit that receives a pre-spacing multiple-word wide data stream and generates a post-spacing multiple-word wide data stream, wherein the multiple-layer shifting circuit is controlled by the plurality of signed offsets.

15. The apparatus of claim 14, wherein the pre-processing circuit comprises: a first translation random access memory to compress the pattern of start-of-packet flags and generate a next owed signal that indicates a number of words owed to make a current packet meet a minimum size.

16. The apparatus of claim 15, wherein the pre-processing circuit further comprises:

a delay circuit that delays the next owed signal by one cycle to obtain an owed signal;

a second translation random access memory that uses the pattern of start-of-packet flags and the owed signal to generate a plurality of offsets and a residue;

an accumulator that accumulates the residue to generate an accumulated residue; and an add array to subtract the accumulated residue from each of the plurality of offsets to obtain the plurality of signed offsets.

17. The apparatus of claim 14, wherein each node in the multiple-layer shifting circuit comprises a look-up table that determines whether or not to shift a data word depending on a signed offset received by the node.

18. The apparatus of claim 14, wherein the multiple-layer shifting circuit comprises:

a first series of rows of nodes, wherein the first series of rows provides a binary progression of right shifts of decreasing shift size; and a second series of rows of nodes, wherein the second series of rows provides a binary progression of left shifts of decreasing shift size, wherein the rows of the second series are interleaved between the rows of the first series.

* * * * *